Oct. 4, 1955 A. J. HENQUET ET AL 2,719,882

AUTOMATIC TELEPHONE SYSTEMS

Filed Nov. 13, 1953 4 Sheets-Sheet 1

Inventor
A. J. HENQUET —
E. P. M. GAUGAIN
By Robert Harding Jr.
Attorney

Inventor
A. J. HENQUET —
E. P. M. GAUGAIN
By Robert Harding Jr.
Attorney

Oct. 4, 1955 A. J. HENQUET ET AL 2,719,882

AUTOMATIC TELEPHONE SYSTEMS

Filed Nov. 13, 1953 4 Sheets-Sheet 3

Inventor
A. J. HENQUET —
E. P. M. GAUGAIN
By Robert Harding Jr.
Attorney

AUTOMATIC TELEPHONE SYSTEMS

Filed Nov. 13, 1953 4 Sheets-Sheet 4

Inventor
A. J. HENQUET –
E. P. M. GAUGAIN

By Robert Harding Jr.
Attorney

United States Patent Office 2,719,882

Patented Oct. 4, 1955

2,719,882

AUTOMATIC TELEPHONE SYSTEMS

André Jean Henquet and Emile Paul Maurice Gaugain, Boulogne-Billancourt, France, assignors to International Standard Electric Corporation, New York, N. Y., a corporation of Delaware Application November 13, 1953, Serial No. 391,875

Claims priority, application France November 28, 1952

4 Claims. (Cl. 179—16)

The present invention relates to automatic telephone systems and more particularly to such systems utilizing cross-bar switches.

In automatic telephone systems when a subscriber is connected to the equipment of a central exchange, it may sometimes be necessary to transmit to this subscriber a busy tone, for instance, when a called subscriber is busy, or, in the case of lost call systems, when all the junctions of the level hunted for are busy. This transmission of the busy tone is generally made from a feeding circuit placed in a point of the connection chain, so that all the parts of the connection chain included between a calling subscriber and the feeding circuit are busy as long as this subscriber has not hung up his receiver.

It has already been suggested, in line circuits comprising a line relay and a cut-off relay, to associate with these two relays another, so called, "fault relay," common to a group of line circuits, these relays being interconnected, so that it is possible to control same from any point of the chain, at the feeding circuit or the final selector circuit, for instance, so that one of the relays of the line circuit is locked in series with a fault relay and the subscriber station which then receives the busy tone in series with the operating circuit of the mentioned relays.

It is then possible to release the connection chain, the devices of the line circuit of the calling subscriber alone remaining operated under control of the subscriber loop. In some automatic telephone systems using cross-bar switches, the line circuit associated with each subscriber line comprises a line relay, the cut-off relay being constituted by the holding magnet of a vertical selector allotted to the subscriber line associated with a number of supplementary contacts. This vertical selector operates generally in combination with the selected extensions controlled by the selection electro-magnets. It is however possible to use this device alone, for instance, when the selection extensions are at rest, and to cause it to operate, so to speak, under no load; that is to say, by having it controlling supplementary contacts without having any action on the horizontal selector contacts.

One of the objects of the present invention is to provide, in an automatic telephone system using cross-bar switches, means for transmitting to the calling subscriber a tone, such as a busy tone, the circuit permitting the transmission of this tone being established by a peculiar combination of the line relay and of the electro-magnet of the vertical selector allotted to a subscriber, this combination being maintained under the control of the subscriber station.

According to one of the features of the present invention, an arrangement is provided for transmitting a characteristic tone, such as a busy tone, to a calling subscriber in an automatic telephone system utilizing cross-bar switches and in which the holding electro-magnet of a vertical selector allotted to a subscriber is also used as cut-off relay, which arrangement comprises in combination: a control member which may be a common member adapted to detect the conditions in which the said characteristic tone must be transmitted to the calling subscriber, means included in the said control member adapted to operate when the characteristic tone must be transmitted to the calling subscriber to cause the operation of the said holding electro-magnet without previously controlling electro-magnets controlling the selection bars, the operating circuit of the said holding electro-magnet being provided in order to lock up in series with the subscriber line and a generator of the said characteristic tone, the said circuit comprising the holding electro-magnet which is released as soon as the subscriber hangs up his receiver.

Other objects, characteristics and advantages of the present invention will appear from a reading of the following description of embodiments incorporating the features of the invention, the said description being given in combination with the accompanying drawings in which.

Figure 1:
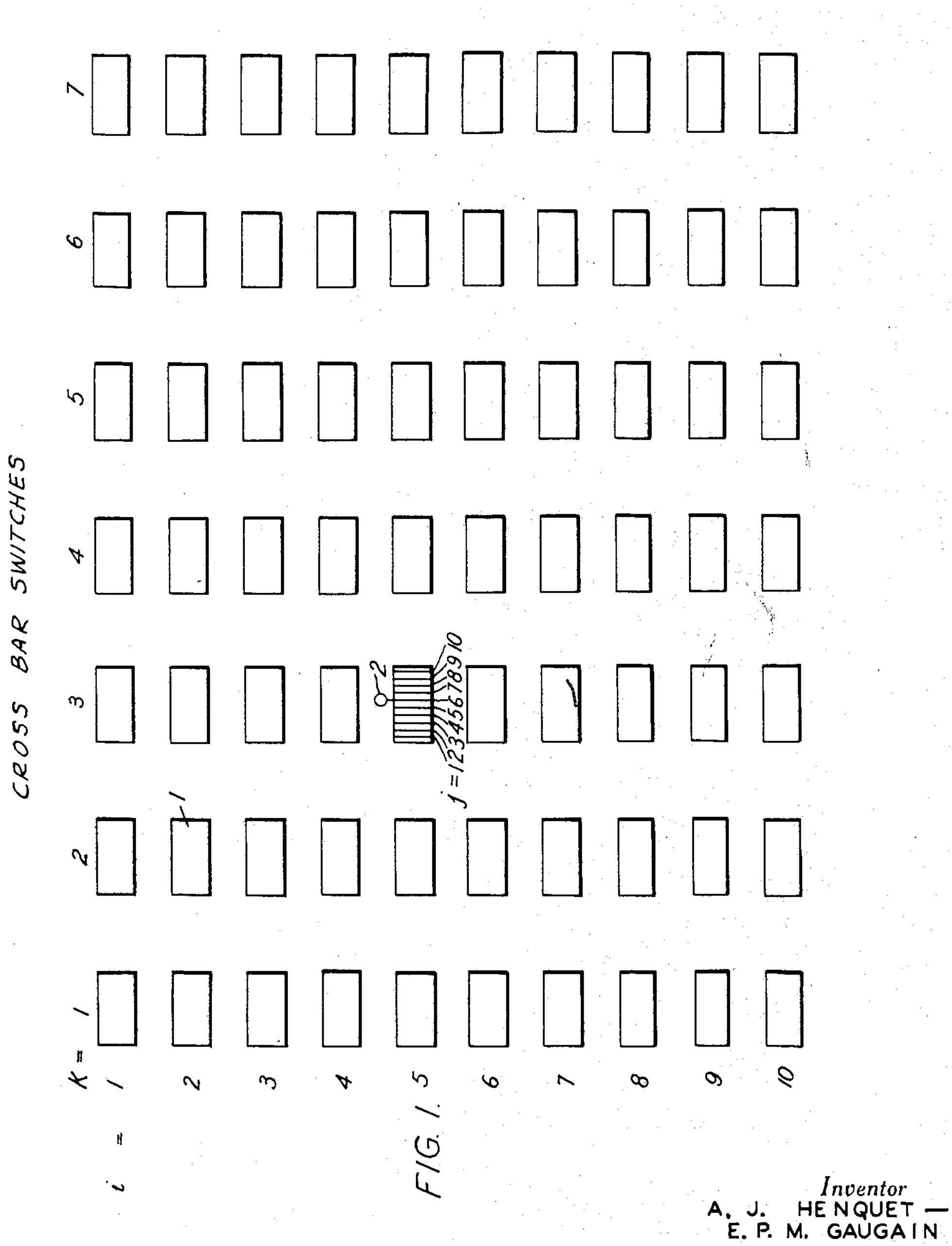
Fig. 1 shows schematically a mode of connection of the subscriber of the line frame.

There will now be described an automatic telephone system incorporating features of the present invention and utilizing cross-bar switches. It will be assumed that each switch has ten or a multiple of ten vertical selectors. Subscribers are connected to a line frame constituted by a certain number of switches associated with a switching equipment, common to the switches of the frame. Each subscriber is characterized in the central exchange by a certain number of different references of his telephone number in the telephone directory. These references comprise on the one hand information relating to the line frame to which the subscriber line-circuit is connected and, on the other hand, information relating to the vertical selector of this frame to which the line circuit is connected and which comprises three references or coordinates. These coordinates, which will be designated in the following description by *ijk*, will be defined in relation to Fig. 1, which shows in schematic form the arrangement of switches of a line frame which may correspond to the actual arrangement of switches on the frame, although this is not necessary. On Fig. 1, each rectangle, such as 1, represents a cross-bar switch comprising ten vertical selectors or a group of ten vertical selectors from a switch having a greater number of selectors. The group represented has seven columns, indicated by 1 . . . 7 at the upper part, every column having ten switches, indicated by 1 to 10 on the left of Fig. 1. The vertical column will be designated by $k$ (1 to 7) and the horizontal row which characterizes the switch to which the line-circuit of a subscriber is connected will be designated by $i$ (1–10). On the other hand, the vertical selector to which the line circuit is connected will be designated by $j$ (1 to 10). For instance, the subscriber represented schematically by a circle 2 (Fig. 1) has for coordinates:

$$K=3,\ i=5,\ j=6$$

Figure 2:
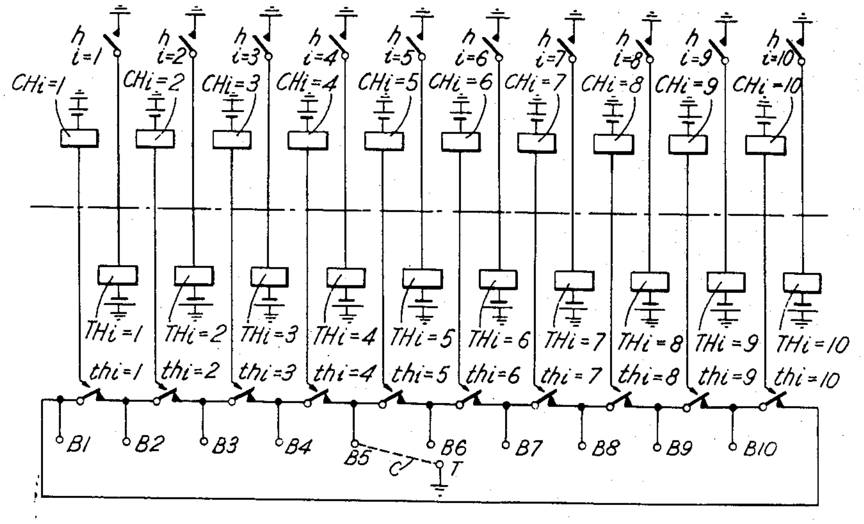
Fig. 2 shows a detailed circuit utilized in the other figures wherein it is schematically represented.
Figure 3:
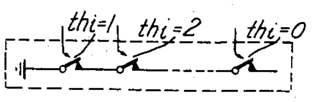
Fig. 3 shows the mode of schematic representation of Fig. 2.

There is shown in Fig. 2 a well known circuit under the name of "chooser circuit" which will be utilized in the following description and which will be represented in the drawings under the schematic form shown in Fig. 3. In the circuit of Fig. 2, every contact $h_i$ ($i$=1 to 10) indicates when it is closed that at least one subscriber of the corresponding row wishes to call. There may be several calls in different ranges simultaneously and it will be assumed, for instance, that the contacts $h_{i=2}$, $h_{i=5}$, $h_{i=7}$ are closed, indicating that at least one subscriber of columns 2, 5 and 7 wants to call. The apparatus represented above the dot and dash line are associated with the line frame; the apparatus represented under this line are part of the marker. Switching devices, such as a connector permitting the connection of the equipment of the line frame to the equipment of the marker are symbolized by the dot and dash line. In the marking circuit, the relays $TH_{i=2}$, $TH_{i=5}$ and $TH_{i=7}$ operate and close the contacts $th_{i=2}$, $th_{i=5}$, and $th_{i=7}$. Owing to the interconnection of the contacts of relays TH*i* and as a ground T is connected to the terminal B5, only the circuit of relay $CH_{i=5}$ is closed. A choice has thus been made between the different rows comprising a calling subscriber. The marker normally comprises means which have not been represented, to modify the connection C, shown in dotted lines, in order to activate the relay $CH_i$ considered as origin at the moment of the choice.

Figure 4:
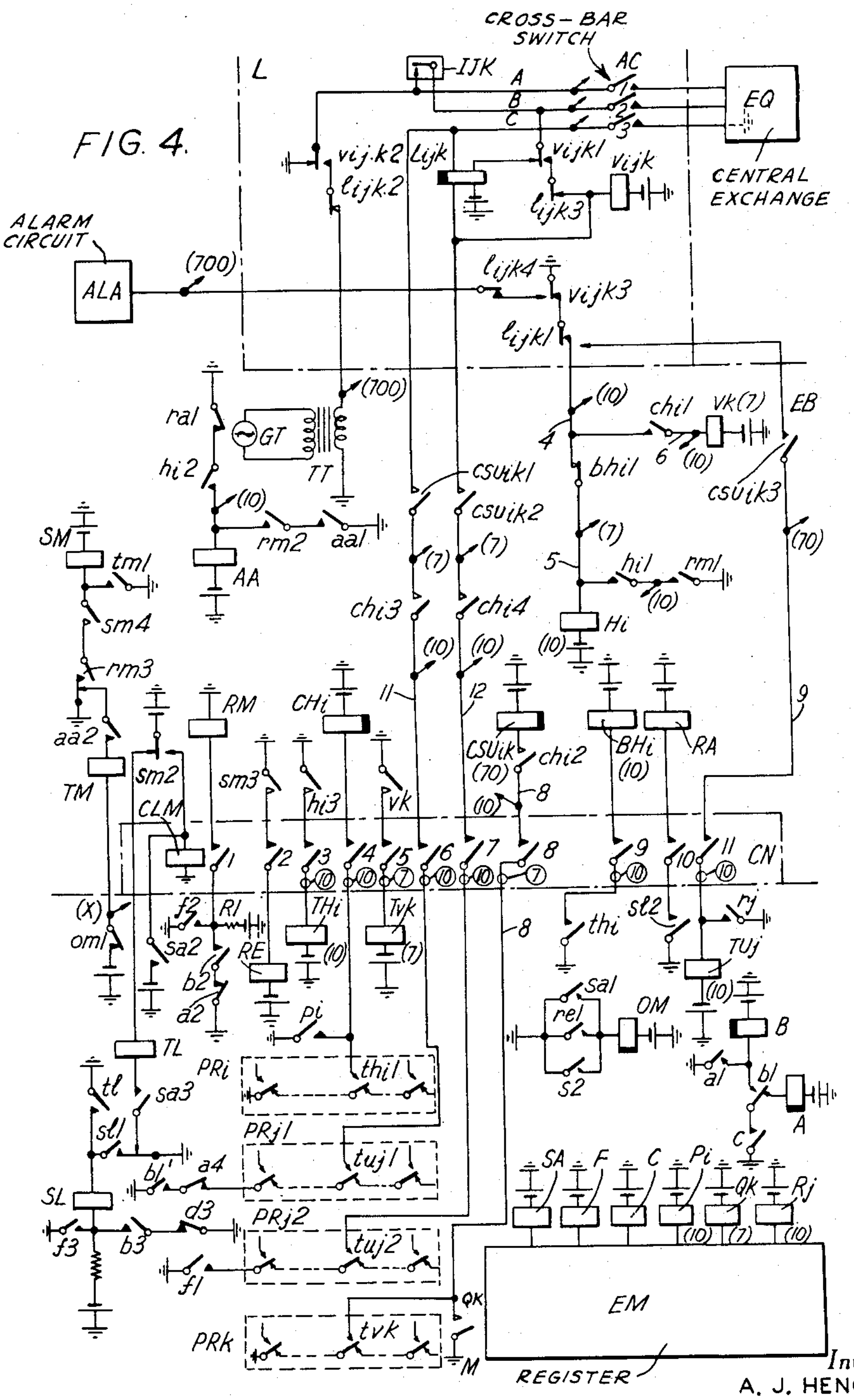
Fig. 4 shows a schematic circuit incorporating features of the invention.

There has been represented in Fig. 4, in schematical form, the line-circuit equipment, the line frame equipment to which is connected this line-circuit, the marking circuit, and the connector utilized to connect the line frame to the marking circuit. The elements of each circuit are represented inside rectangles drawn with dot and dash lines. The line equipment has been designated by L, the frame equipment by EB, the connector by CN and the marker by M. Only the necessary elements for an understanding of the invention and which are used in connection with the line circuit shown have been represented. However, as one line frame has 700 subscribers connected to it, the connections to the other line circuits are shown by means of arrows indicating multipled connections the precise meaning of which will be indicated in the following description. On the other hand, the mode of representation of switching members utilized is known under the name of "divorced contacts." Each switching member, such as a relay, is indicated by one or several capital letters to which is added one or several indicia, *ijk*, which indicate, as has been explained above, the references of subscriber line circuits which utilize such members or devices. The switching devices which are common to all the subscribers of the frame do not bear such indica. On the other hand relay contacts are indicated by the same letters as the operating coil, but in small letters and have moreover a numerical reference (1 to 10). The subscriber's station has been indicated by a rectangle IJK inside of which there is shown only the switching hook which is closed when the subscriber takes off his receiver.

When the subscriber takes off his receiver, so closing the switch hook IJK, relay $L_{ijk}$ operates by means of the following circuit: battery, right hand winding of the relay $L_{ijk}$, break contact $v_{ijk}$1, wire B, subscriber station, wire A, break contact $v_{ijk}$2, ground. It must be noticed that the wires A, B, C, are connected to contacts 1, 2, 3, of a cross-bar switch, schematically represented at AC, which, by its operation, may connect wires A, B, C, to the central exchange equipment which has been schematically represented by rectangle EQ. Arrows represented on wire A, B, C indicate that these wires are multipled on other contacts of switch AC, for example to nine other contact groups, such as 1, 2, 3. The relay $L_{ijk}$, by its operation closes the circuit of relay $H_i$ which is common to all the subscribers (70) of the same horizontal row of the frame.

The operating circuit of relay $H_i$ is the following: battery, winding of relay H, break contact *bhi*1, work contact $1_{ijk}$1, back contact $v_{ijk}$3, ground. The arrow which is placed on this circuit close to the contact $1_{ijk}$1 and which carries the reference (10) indicates that the conductor 4 is common to 10 subscribers connected to a switch of the row *i*, whilst the arrow placed on this circuit and having the reference (7) indicates that the conductor 5 is connected to the seven conductors 4 outgoing from seven switches of the row *i*.

There are ten relays $H_i$ for one frame equipment EB. There is also a relay $H_i$ operated every time there is at least one subscriber calling in the corresponding horizontal row *i*. It will be noticed that there are seven similar contacts $bh_i$1 for each group of 70 subscribers belonging to the same vertical row *i*. Relay $H_i$ prepares a locking circuit by its make contact $h_i$1 which will be closed by contact *rm*1. The arrow (10) indicates that the contact *rm*1 is common to 10 relays $H_i$. By its contact $h_i$2 one relay $H_i$ operated causes the operation of relay AA, common to all the equipment EB of line frames. The arrow (10) represented close to contact $h_i$2 indicates that the relay AA is controlled by any one of 10 relays $H_i$. The relay AA indicates by its operation that at least one subscriber of the frame wants to place a call, and causes switching operations which lead to the connection of a free marker M to the calling line frame EB by means of a connector CN.

The availability of the marking circuit M is indicated by the fact that relay OM is at rest. Contact *om*1 is multipled on all the frame equipments to which the marker M has access, and this is indicated by the arrow (X). If the marker M is free, relay TM operates by means of the following circuit: ground, break contact *rm*3, make contact *aa*2, winding of relay TM, break contact *om*1, battery. Relay TM, by its make contact *tm*1, causes the operation of relay SM which, by its contact *sm*2 closes the connector relay circuit CLM.

The connector relay CLM connects the marker circuit M to the line frame equipment EB by its contacts 1 to 11. The relay RM operates in series with the contact 1 of the connector and resistance R1, and closes the holding circuit of line frame EB at *rm*2 which holds relay AA. It is obvious that, as will be explained later on, the connector comprises a much greater number of contacts, however there has been shown only the necessary contacts for the switching operations concerning the line circuit L represented. Relay RE of the marker circuit M operates as soon as contact 2 of connector CLM is closed, and by its contact *re*1 it causes the operation of relay OM, busying the marker circuit M. Relay TM falls back, the relay SM being operated under control of contact *rm*3.

As soon as the connector relay CLM operates, relays $TH_i$ of the marker circuit M, corresponding to the relays $H_i$ operated from line frame EB, operate. There are 10 relays $TH_i$ and 10 contacts 3 of the corresponding relay connector CLM in the connector CN, as is indicated by the number 10 in parentheses. Relays $TH_i$, $CH_i$, and contacts $h_i$3 form a switching set similar to the one represented in Fig. 2. The chain of contacts $th_i$1 represented inside the dotted frame $PR_i$ effects a choice, so that only one relay $CH_i$ operates in the frame equipment EB, indicating the row *i* inside which further switching operations will permit the choice of the subscriber who will first receive the dialling tone (assuming that there are several subscribers wanting to call in this row).

The relays $BH_i$ (of which there are 10, one for each horizontal row, and which correspond to relays $TH_i$) operate. By its contact $ch_i$1 relay $CH_i$ closes the relay circuit $V_k$. There are seven relays $V_k$ (one per vertical column) and each relay is common to the group of 100 subscribers of the corresponding column *k*. The arrow represented near the relay $V_k$ indicates that the conductor 6 is common to 10 groups of 10 subscribers of the same column. There may be several relays $V_k$ which operate if there are several subscribers calling in the same row *i* and in different columns.

Relays $TV_k$ (numbering 7) and the contacts chain $tv_k$ operate, as has been described in relation to Fig. 2, to prepare the operation of and operate a single relay $CSU_{ik}$. There are provided 70 relays $CSU_{ik}$ per frame equipment EB, that is to say, one per switch. The 10 relays $CSU_{ik}$, corresponding to the switches of the same vertical column are connected to a conductor 8 by contacts $ch_i$2 of different relays $CH_i$ corresponding to different horizontal rows. As only one relay $CH_i$ is operated, a single relay $CSU_{ik}$ operates. This relay $CSU_{ik}$ corresponds to a particular cross-bar switch, and, when operated, closes all the contacts $csu_{ik}$3 connected to subscribers' line circuits associated with that switch. Any of these subscribers who are calling will operate the corresponding $TU_j$ relay. There are 10 relays $TU_j$ corresponding to 10 rows of each switch; there are thus ten conductors 9. All the subscribers of the same row on the 70 switches are connected to the same conductor 9 by contacts $csu_{ik}$3. There are as many relays $TU_j$ operated as there are calling subscribers in the switch determined by the relay $CSU_{ik}$ operated.

The chains of contacts $PR_j$1, $Pr_j$2, make a choice among the calling subscribers of the switch previously chosen. However, the devices of the line circuit and in particular the electro-magnet $V_{ijk}$, are not yet operated.

Only such parts of the marking circuit have been shown which are necessary to carry the present invention into effect. However, it is obvious that the marking circuit has a certain number of other circuits provided, for example, to test the different connections permitting the connection of a calling line to a registry circuit, a called subscriber, or an output junction. Likewise every cross bar switch is provided, besides the holding electro-magnets $V_{ijk}$, which have been represented and which are utilized as cut off relays, with selection electromagnets which have not been represented and which are also controlled from the marking circuit.

As soon as the switching operations which have been described have been effected, the marker knows the coordinates *ijk* of the calling subscriber. The marking circuit then performs the switching operations leading to the test of a register circuit and the circuit permitting the connection of the line circuit to the register circuit. When it has determined a free register circuit and the circuit permitting the inter-connection of the register and the calling line circuit which has been determined, as has been described above, the marking circuit controls the selection bars of the cross bar switches which determine the chosen circuit between the line circuit and the register. It later controls the operation of the holding electro-magnets. These operations will only be described for the case of the electro-magnet $V_{ijk}$ of the switch to which is connected the line circuit considered.

If the connection is to be established, the marker causes the operation of relay C. The relays A and B operate one after the other and as these relays are slow to operate, they are both operated during a short interval of time during their cycle of operation. The electro-magnets for horizontal selection are controlled, by means which have not been shown, at the time when relays A and B are simultaneously operated.

When relay A falls back, a ground is connected by contact *b*1' and contact *a*4 at the chain of contacts $PR_j$1 causing the operating of the electro-magnet $V_{ijk}$ by means of the following circuit: battery, winding of electro-magnet $V_{ijk}$, left hand winding of relay $L_{ijk}$, make contact $csu_{ik}$1, make contact $ch_i$3, make contact 6 of connector CLM, make contact $tu_j$1, break contact of the chain of contacts $PR_j$, break contact *a*4, make contact *b*1', ground A holding ground is connected to wire C by the equipment EQ of the central exchange, and when the marker, which has fulfilled its function, causes the release of connector CLM in a manner to be described and the freeing of the equipment EB of the frame, relay $L_{ijk}$ and the electro-magnet $V_{ijk}$ are held in series by means of the following circuit: battery, winding of electro-magnet $V_{ijk}$, left hand winding of the line relay, wire C, make contact 3 of switch AC, ground connected to wire C in the equipment EQ of the central exchange.

The release is obtained as soon as relay B falls back. Relay RM of line frame EB is short-circuited by back contact *a*2 and make contact *b*2. Relay RM by falling back causes the release of relays SM, AA, $H_i$. Relay SM causes the release of the connecting relay CLM which opens the holding circuits of the line frame and of the marker circuit.

It is easy to understand that the conductor 11 is common to the 70 subscribers connected to the same level of the 70 switches. The arrow (7) indicates that the seven subscribers of the same level in a level *i* are grouped by means of the contacts $csu_{ik}$1 and the arrow (10) that conductor 11 is common to 10 levels by means of contacts $ch_i$3. The arrangement is the same for conductor 12. There is obviously provided 10 conductors 11 and 10 conductors 12.

It will be assumed that the tests made by the marker have not succeeded and it is necessary to transmit to the subscriber a chaarcteristic tone, for example, the busy tone, in order to indicate to this subscriber that he should hang up his receiver. The marker then causes operation of relay F, instead of relay C, by means not shown, but, resulting from the fact that relays A and B do not operate, the marker does not cause the operation of the selection bars, so that the electro-magnet $V_{ijk}$ operates without driving the contacts. The electro-magnet $V_{ijk}$ operates by means of the following circuit: battery, winding of the electro-magnet $V_{ijk}$, make contact $csu_{ik}$2, make contact $ch_i$4, make contact 7 of connecting relay CLM, make contact $tu_j$2, chains of contacts $PR_j$2, make contact *f*1, ground.

Relay $L_{ijk}$ falls back as soon as contact $v_{ijk}$1 is open. The make contact *f*2 causes the release of relay RM, so that the marker M and the equipment of the frame EB are released.

As soon as the marker circuit M is released and ground is suppressed from conductor 12, the electro-magnet $V_{ijk}$ is held under the control of the subscriber loop by means of the following circuit: battery, winding of the electro-magnet $V_{ijk}$, break contact $1_{ijk}$3, make contact $v_{ijk}$1, wire B, subscriber loop, wire A, make contact $v_{ijk}$2, break contact $1_{ijk}$2, secondary winding of transformer TT, ground. The subscriber receives the tone applied to the primary winding of transformer TT by the generator GT.

Only the line circuit is then actuated under the control of the calling subscriber. The tone generating circuit may be for instance common to the line circuits of the frame and this is indicated by the arrow indicating multipled connections (700).

The circuit of the alarm device ALA, which may be common to the subscribers of the frame or of several frames is closed by the make contact $v_{ijk}$3 and the break contact $1_{ijk}$4.

During the normal operation of the telephone system, shown in part for explaining this operation of the circuits of the invention, the marking circuit hunts for a free register and controls the switching operations which lead to the connection of the calling subscriber to the register. It also transfers to this circuit the information concerning the position in the central exchange of the called subscriber, that is to say, the indication of the frame to which it is connected and of its coordinates *ijk* in this frame. The marker is afterwards freed and may be used for other calls.

When the register has received from the calling subscriber and registered the indications concerning the number of the called subscriber, it connects to a free marker to which it transmits indications concerning the number of the calling subscriber and the number of the called subscriber. The indications concerning the number of the called subscriber are used by the marker for the test of the called subscriber. The indications concerning the position of the calling subscriber are used for the hunting of the calling subscriber. For this purpose, the coordinates *ijk* of the subscriber in the frame are registered on the relays $P_i$ ($i=1$ to 10), $Q_k$ ($k=1$ to 7) and $R_j$ ($j=1$ to 10).

As soon as the marker has seized a connector permitting the connection of the marker to the frame equipment, the marker causes the operation of the relay SA. By its contact *sa*1, relay SA causes the operating of the relay OM and by its contact *sa*2, it causes the operation of relay CLM of the connecting circuit. Relay TL operates, as soon as the contact *sa*3 is closed, thus causing the operation of relay SL which is locked by its contact *sl*1 which opens the circuit of relay TL. Relay SL, by its contact *sl*2 closes the circuit of relay RA which, by its contact *ra*1, opens the circuit of relay AA.

Relays $P_i$, $Q_k$, and $R_j$ operated will cause respectively the operation of a relay $CH_i$, a relay $CSU_{ik}$ and a relay $TU_j$ which completely determine the calling subscriber.

The operating ground of the electro-magnet is applied, as in the previous case, either by the intermediary of the chain of contacts $PR_j1$ or by the intermediary of the chain of contact $PR_j2$, according to whether it is desired to establish a normal connection with the equipment of the central exchange (operation of relay C) or to establish the so-called "fault combination" (operation of relay F.) In the case of a normal connection (operation of relay C), relays A and B cause the release of the marker. In the case of the establishment of the 10 called "fault combination" the release is obtained by the closure of contacts *f*2 and *f*3.

Figure 5:
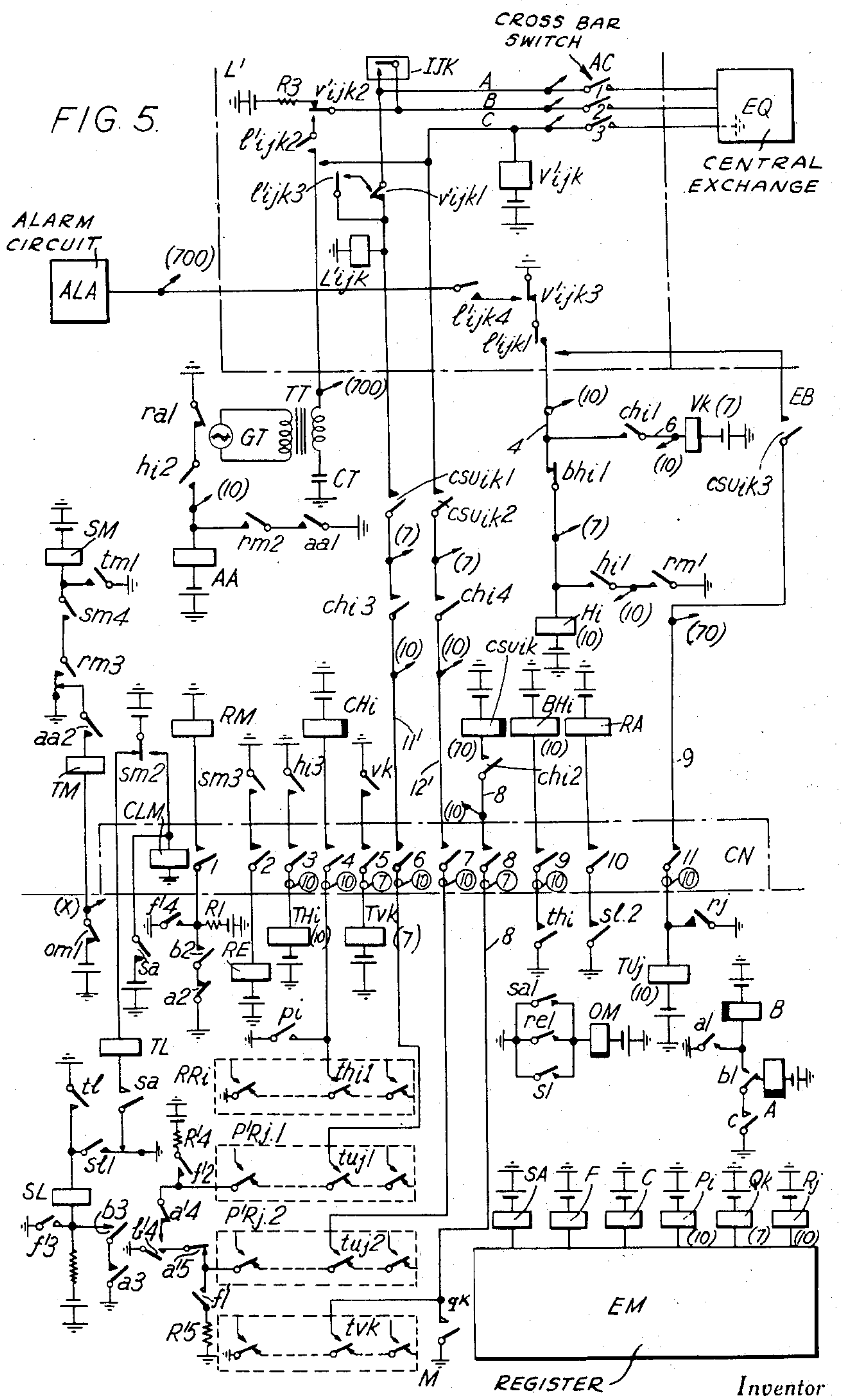
Fig. 5 shows an alternative of the arrangement represented in Fig. 4.

In Fig. 5 an alternative of the circuit of Fig. 4 has been shown. The difference between these two circuits resides mainly in the arrangement of the line circuit and the arrangement of the contacts of the marker utilized for controlling the chains contacts $PR_j1$ and $PR_j2$. The elements which in this figure fulfil different functions are marked with the addition of the index "′".

When a subscriber is calling, his line relay operates by means of the following circuit: battery, resistance R3, break contact $v'_{ijk}2$, wire B, subscriber station IJK, wire A, break contact $v'_{ijk}1$, winding of relay $L'_{ijk}$, ground. Then the relay $L'_{ijk}$, by its make contact $l'_{ijk}1$ causes switching operations which have been described in connection with Fig. 4.

When the marker causes the operation of relay SA, it causes the connection of the marker M to the lines rack EB by means of connector CN, as has already been described. Whichever of the relays $P_i$, $Q_k$, $R_j$, have been operated determine the subscriber which must be reached by the marker.

If the connection is to be established, the marker causes the operation of relay C which causes in its turn the operation of relays A and B. Relay A operates, causing the operation of relay B which, in its turn opens the operating circuit of relay A. By the make contact *b′*4 and break contacts *a′*4 and *a′*5 a ground is connected to chains of contacts $p'R_j1$ and $P'R_j2$. The electro-magnet $V'_{ijk}$ operates in series with the ground connected to conductor 12′, the ground connected to conductor 11′ short-circuiting relays $L'_{ijk}$.

When the operating grounds applied to conductor 11′ and 12′ are suppressed, the electro-magnet $V'_{ijk}$ is held by the ground connected to the wire of the equipment EQ of the central exchange. The release of the control device is made under the same conditions as in the case of Fig. 4.

If the fault combination is to be established in the line circuit, the marker M causes the operation of relay F, instead of relay C. Under these conditions, a ground is connected to the chain of contacts $P'R_j2$ and to the conductor 12′ by contact *f′*1 through the resistance R′5, whereas a battery is connected to the chain of contacts $P'R_j1$ and to conductor 11′ by make contact *f′*2 through the resistance R′4. The relay $L'_{ijk}$ and the electro-magnet $V'_{ijk}$ operate, and when the control potentials are no longer applied by the conductors 11′ and 12′, during the release of the marker, as has already been explained, relay $L'_{ijk}$ and the electro-magnet $V'_{ijk}$ are held in series by means of the following circuit: battery, winding of the electro-magnet $V'_{ijk}$, wire C, make contact $l'_{ijk}2$, make contact $v'_{ijk}2$, wire B, subscriber station IJK, wire A, make contact $v'_{ijk}1$, make contact $l'_{ijk}3$, winding of relay $L'_{ijk}$, ground.

The alternating current of generator GT is then transmitted to the calling subscriber by means of following circuit: ground, condenser CT, secondary winding of transformer TT, make contact $l'_{ijk}2$, make contact $v'_{ijk}2$, wire B, subscriber station, wire A, make contact $v'_{ijk}1$, make contact $l'_{ijk}3$, winding of relay $L'_{ijk}$, ground.

A ground is applied to an alarm circuit, which may be a circuit with deferred operation, by means of the make contact $v'_{ijk}3$, and of the make contact $l'_{ijk}4$.

The relay $L'_{ijk}$ and the electro-magnet $V'_{ijk}$, fall back as soon as the subscriber hangs up.

It is clear that whereas means have been described permitting control of the establishment of a particular combination of switching elements of a line circuit, so called "fault combination" in relation to a particular type of automatic telephone system utilizing cross bar switches, these means are adapted in an obvious manner for those skilled in the art to other automatic telephone systems utilizing such switching means and in which the holding electro-magnet of the switch to which the subscriber's line is connected is utilized as a cut-off relay.

While the principles of the invention have been described above in connection with specific embodiments and particular modifications thereof, it is to be clearly understood that this description is made only by way of example and not as a limitation on the scope of the invention.

What is claimed is:

1. In an automatic telephone system using cross-bar switches having vertical selector hold magnets, a plurality of line circuits, a line relay for each line circuit, a source of characteristic tone, a marker, means initiated by the operation of a line relay associated with a calling line for connecting said marker to said calling line, means in said marker for determining if said tone is to be transmitted to said calling line circuit, means operated by said determining means for operating the vertical selector hold magnet associated with said calling line circuit and for releasing said operated line relay, and a circuit completed when a line relay is unoperated and its associated vertical selector hold magnet is operated for connecting said tone source to the associated line circuit.

2. In an automatic telephone system using cross-bar switches having vertical hold magnets, the combination, as defined in claim 1, in which the means operated by the determining means for operating the vertical selector hold magnet associated with the calling line circuit and releasing the operated line relay comprises a circuit in the marker, means controlled by said marker for connecting said circuit to said vertical hold magnet, means in said marker for connecting a potential to said circuit, whereby said vertical hold magnet is operated, and means for breaking the circuit of the line relay of said calling line circuit when said vertical hold magnet is operated and said potential is connected to said circuit.

3. In an automatic telephone system using cross-bar switches having vertical selector hold magnets, a plurality of line circuits, a line relay for each line circuit, a central exchange, a source of characteristic tone, a marker, means initiated by the operation of a line relay associated with a calling line for connecting said calling line to said marker, testing means in said marker for determining if a connection is to be established, means operated by said testing means if said connection is to be established for initiating procedure for establishing the connection between said calling line and said exchange under control of the vertical hold magnet associated with said calling line, means for operating said vertical hold magnet to complete said connection between said calling line and said exchange, means also operated by said testing means, if said connection is not to be established, for operating said vertical hold magnet before the connection procedure is initiated and for releasing said operated line relay, and a circuit completed when a line relay is unoperated and its associated vertical hold magnet is operated for connecting said tone source to the associated line circuit.

4. In an automatic telephone system using cross-bar switches having vertical selector hold magnets, the combination, as defined in claim 3, in which the means operated by the testing means, if the connection is not to be established, for operating the vertical selector hold magnet associated with the calling line circuit and releasing the operated line relay comprises a circuit in the marker, means controlled by said marker for connecting said circuit to said vertical hold magnet, means in said marker for connecting a potential to said circuit, whereby said vertical hold magnet is operated, and means for breaking the circuit of the line relay of said calling line circuit when said vertical hold magnet is operated and said potential is connected to said circuit.

References Cited in the file of this patent

UNITED STATES PATENTS

| | | |
|---|---|---|
| 2,534,822 | Jacobacus | Dec. 19, 1950 |
| 2,658,108 | Haines et al. | Nov. 3, 1953 |